United States Patent Office 3,491,156
Patented Jan. 20, 1970

3,491,156
α-CHLORO-β-TRICHLOROMETHANESULFENYL ALKENES
Christ N. Yiannios, North Haven, and Joseph V. Karabinos, Orange, Conn., assignors to Olin Mathieson Chemical Corporation, a corporation of Virginia
No Drawing. Filed Mar. 30, 1967, Ser. No. 626,924
Int. Cl. C07c *149/16*
U.S. Cl. 260—609         19 Claims

ABSTRACT OF THE DISCLOSURE

A series of α-chloro-β-trichloromethanesulfenyl alkenes having the formula

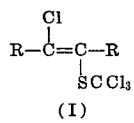

(I)

wherein each R is independently selected from the group consisting of hydrogen, alkyl, haloalkyl, cycloaliphatic and aryl, and α - chloro - β - trichloromethanesulfonyl alkenes having the formula

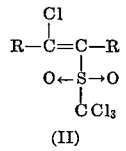

(II)

wherein R is as previously described is disclosed. These compounds are valuable agricultural chemicals such as fungicides and herbicides.

---

This invention relates to a series of α-chloro-β-trichloromethanesulfenyl alkenes having the formula

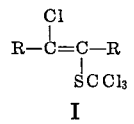

I wherein each R is independently selected from the group consisting of hydrogen, alkyl, haloalkyl, cycloaliphatic and aryl. This invention also relates to a series of α-chloro-β-trichloromethanesulfonyl alkenes having the formula

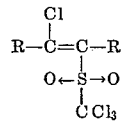

II wherein R is as previously described.

The fully saturated α-chloro-β-trichloromethanesulfenyl alkanes have been previously prepared and reported in the literature. For example, U.S. Patent 2,553,772 discloses the reaction of alkenes with perchloromethyl mercaptan (otherwise known as trichloromethanesulfenyl chloride) to provide compounds having the formulae

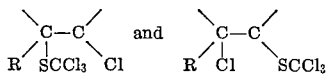

Now it has been found that trichloromethanesulfenyl chloride reacts with acetylenic compounds in accordance with the following equation to provide the unsaturated α-chloro-β-trichloromethanesulfenyl alkenes I wherein R is as previously described.

III     $RC \equiv CR + ClSCCl_3 \rightarrow I$

The alkynes III suitable for use in the process of this invention are known materials, and are readily provided by a variety of conventional techniques. Exemplificative alkynes include phenyl acetylene, biphenyl acetylene, 1-phenyl-1-hexyne, 5-decyne, 1-chloro-4-nonyne, 1-chloro-4-decyne, 4-octyne, 1-phenyl-1-butyne, 3-hexyne, methyl phenyl acetylene, 1,4-dichloro-2-butyne, 2-pentyne, 1-octyne, 1-heptyne, 1-hexyne, 2-dodecyne, 2-tetradecyne, 2-octadecyne, bis-cyclopentylacetylene, bis-cyclohexylacetylene, cyclohexylacetylene, naphthylacetylene, 1 - (2-naphthyl)-2-phenyl-ethyne and the like. While any of the above alkynes can be employed in the process of this invention, preferred embodiments utilize alkynes having the Formula III wherein each R is independently selected from the group consisting of hydrogen, alkyl having from 1 to 5 carbon atoms, chloroalkyl having from 1 to 5 carbon atoms, cycloaliphatic having from 5 to 7 carbon atoms and aryl having from 6 to 10 carbon atoms.

The reaction of trichloromethanesulfenyl chloride with the alkynes III can be carried out under various conditions. Thus according to one process embodiment, the reactants are heated at a temperature in the range between about 10°–160° C., and preferably between about 70°–140° C., to provide the desired product I. The reaction is generally exothermic and techniques such as external cooling and controlled addition of one reactant to the other are employed to maintain the temperature within the desired range.

In a second process embodiment, the alkyne III is reacted with trichloromethanesulfenyl chloride under ultra violet radiation at room temperature. In both processes, the desired α-chloro-β-trichloromethanesulfenyl alkenes I are readily isolated by conventional techniques such as distillation, crystallization, filtration and the like.

The α-chloro-β-trichloromethanesulfonyl alkenes II are provided by oxidation of the corresponding α-chloro-β-trichloromethanesulfenyl alkenes I. Preferably, oxidation is effected by reaction of the α-chloro-β-trichloromethanesulfenyl alkene I with chromic oxide in glacial acetic acid solution at a temperature between about 0–50° C., and preferably between about 15°–25° C. Surprisingly, the chromic oxide attacks only the sulfur in the trichloromethylthio moiety, leaving the double bond intact. The desired product II is isolated from the reaction mixture by conventional techniques, such as those described previously as suitable for isolating the α-chloro-β-trichloromethanesulfenyl alkenes.

The compounds I and II of this invention have a wide variety of useful applications. They are particularly valuable agricultural chemicals, exhibiting pesticidal activity as fungicides, herbicides, algaecides, insecticides, etc. Generally, they are mixed with various adjuvants in these applications, and low concentrations of the compound are extremely effective. For example, it has been found that these compounds are effective soil fungicides against a wide variety of plan pathogenic fungi. Thus, an aqueous solution containing 250 p.p.m. of S-(2-chloro-1,2-diphenylethylene-1-yl) trichloromethylsulfide was 100 percent effective in inhibiting spore germination of *Alternaria solani*, a soil-borne fungus which causes tomato early blight and is harmful to a wide variety of other economic crops. Solutions containing 250 p.p.m of S-(1,5-dichloro-nonene-4-yl) trichloromethylsulfied and S-(2-chloro-octene-1-yl) trichloromethylsulfide were similarly effective in inhibiting *Alternaria solani* spore germination.

At concentration of 25 p.p.m. in aqueous solutions, the three aforementioned compounds were 100 percent effective in inhibiting germination of *Monilinia fructicola* spores, a plant fungus which causes brown rot of stone fruit, destroying such crops as peaches, plums, apricots, and the like. *Rhizoctonia solani* spores, a soil-borne fungus harmful to cotton, vegetables, potatoes, turf, grass, etc., was 89 percent inhibited by an aqueous solution containing 50 p.p.m. of S-(3-chloropentene-2-yl) trichloromethylsulfone.

The post-emergence herbicidal effectiveness of these compounds is illustrative by the control of rye grass, crab grass, mustard and pigweed by S-(2-chloro-1,2-diphenylethylene-1-yl) trichloromethylsulfide at a rate of application of 20 pounds per acre.

Furthermore, the presence of the reactive double bond in compounds I and II confers valuable properties on these compounds, rendering them useful as chemical intermediates in the preparation of a wide variety of materials. For example, they are halogenated to provide a series of polyhalogenated compounds which are valuable agricultural chemicals.

The following examples serve to illustrate the preparation of various α-chloro-β-trichloromethanesulfenyl alkenes included in Formula I and α-chloro-β-trichloromethanesulfonyl alkenes represented by Formula II.

EXAMPLE 1

Biphenyl acetylene (10 g., 0.06 mole) and trichloromethanesulfenyl chloride (11 g., 0.06 mole) were mixed together in a 2-necked round bottom flask equipped with thermometer and magnetic stirrer. After heating at 125° C. for 1 hour, the mixture was allowed to cool to 95° C. and digested at this temperature overnight. The flask was then attached to a distilling head and approximately 1 g. of volatiles removed at 47° C./2.7 mm. Hg. The resulting distillation residue crystallized on standing, providing 20 g. (95% yield) of crude product, which was recrystallized from 150 ml. of absolute ethanol and dried under vacuum at room temperature to provide 12 g. of shiny needles, M.P. 115–116° C., $n_D^{25}$ 1.5935. Infrared analysis and the following analytical data revealed that the α-chloro-β-trichloromethanesulfenyl alkene having the name S - (2-chloro-1,2-diphenylethylene-1-yl) trichloromethylsulfide had been obtained.

*Analysis.*—Calcd. for: C, 49.44%; H, 2.74%; Cl, 39.50%; S, 8.78%. Found: C, 49.93%; H, 2.76%; Cl, 39.31%; S, 8.78%.

EXAMPLE 2

1-phenyl-1-hexyne (47.4 g., 0.3 mole) was placed in a 150 ml. 2-necked round bottom flask equipped with a thermometer, a magnetic stirrer and a water condenser and heated to 125° C. Trichloromethanesulfenyl chloride (55.8 g., 0.3 mole) was added in small increments from a dropping funnel to the 1-phenyl-1-hexyne. An exothermic reaction occurred during the addition, and the heating was adjusted to maintain a reaction temperature between about 130–140° C. The reaction mixture was maintained at 135° C. for 4 hours after the addition of the trichloromethanesulfenyl chloride was completed, and then digested at room temperature overnight. Distillation of the reaction mixture provided 58 g. of yellow liquid distilling at 153–154° C./0.55 mm. Hg. Infrared analysis and the following analytical data revealed that S-(2-chloro-1-phenylhexene-2-yl) trichloromethylsulfide had been obtained.

*Analysis.*—Calcd. for: C, 45.40%; H, 4.09%; Cl, 41.28%; S, 9.31%. Found: C, 45.90%; H, 4.19%; Cl, 41.20%; S, 9.30%.

EXAMPLE 3

Following the procedure of Example 2, trichloromethanesulfenyl chloride (76.4 g., 0.4 mole) was added to 5-decyne (55.2 g., 0.4 mole) while maintaining a temperature between 140–145° C. After the addition was completed, the reaction mixture was digested at 120° C. for 4 hours and then distilled to provide a yellow liquid, B.P. 128–130° C./0.8 mm. Hg. Redistillation at 119–120° C./0.35 mm. Hg provided 110 g. (88% yield) of yellow liquid, $n_D^{25}$ 1.5184. Infrared analysis and the following analytical data revealed that S-(2-chloro-1,2-dibutylethylene-1-yl) trichloromethylsulfide had been obtained.

*Analysis.*—Calcd. for: C, 40.80%; H, 5.56%; Cl, 43.90%; S, 9.89%. Found: C, 40.80%; H, 5.64%; Cl, 43.40%; S, 9.85%.

EXAMPLE 4

A mixture of 1-chloro-4-nonyne (15.7 g., 0.1 mole) and trichloromethanesulfenyl chloride (18.6 g., 0.1 mole) was heated slowly in a 2-necked round bottom flask. When the temperature of the reaction mixture reached 110° C., an exothermic reaction occurred and the temperature rose to 175° C. Heating was discontinued and the reaction mixture allowed to cool to 100° C. and digested at this temperature for 1 hour. Distillation of the reaction mixture provided 25 g. (73% yield) of a liquid boiling at 158–160° C./2.5 mm. Hg. Redistillation provided 24 g. of yellow liquid, B.P. 159–160° C./2.5 mm. Hg, $n_D^{25}$ 1.5364. Infrared analysis and the following analytical data revealed that S-(1,5-dichlorononene-4-yl) trichloromethylsulfide had been obtained.

*Analysis.*—Calcd. for: C, 34.86%; H, 4.45%; S, 9.65%. Found: C, 35.22%; H, 4.33%; S, 9.29%.

EXAMPLE 5

1-chloro-4-decyne (17.25 g., 0.1 mole) was mixed with trichloromethanesulfenyl chloride (18.6 g., 0.1 mole) utilizing the equipment described in the previous examples. The reaction mixture was heated slowly; when the temperature reached 95° C., an exothermic reaction occurred and the temperature rose to 130° C. The reaction mixture was allowed to cool to 90–95° C. and digested at this temperature for 2 hours. Distillation of the reaction mixture provided 30 g. (84% yield) of light orange liquid, B.P. 173–176° C./3.2 mm. Hg, $n_D^{25}$ 1.5935. Infrared analysis and the following analytical data revealed that S-(1,5-dichlorodecene-4) trichloromethylsulfide had been obtained.

*Analysis.*—Calcd. for: C, 37.10%; H, 4.76%; Cl, 49.54%; S, 8.92%. Found: C, 37.22%; H, 4.69%; Cl, 49.00%; S, 9.14%.

EXAMPLE 6

4-octyne (55 g., 0.5 mole) was heated ot 137° C. in a 2-necked flask equipped as in the previous examples. Trichloromethanesulfenyl chloride (93 g., 0.5 mole) was added in small increments to the 4-octyne. Initially an exotherm occurred, and the reaction temperature rose to 148–150° C. There after, the rate of addition of trichloromethanesulfenyl chloride was regulated to maintain a reaction temperature between 140–145° C. When the addiiton was completed, the reaction mixture was digested at 110–115° C. for 4 hours. Distillation of the reaction mixture provided 135 g. of crude product boiling at 102° C./0.7 mm. Hg. The product was purified by redistillation to provide 130 g. of yellow liquid, B.P. 105–106° C./0.7 mm. Hg, $n_D^{25}$ 1.5254. Infrared analysis and the following analytical data revealed that S-(2-chloro-1,2 - dipropylethylene - 1 - yl) trichloromethylsulfide had been obtained.

*Analysis.*—Calcd. for: C, 36.62%; H, 4.74%; Cl, 48.00%; S, 10.87%. Found: C, 36.71%; H, 4.68%; Cl, 47.80%; S, 10.85%.

EXAMPLE 7

Following the procedure of Example 2, trichloromethanesulfenyl chloride (74.4 g., 0.4 mole) was added to 1-phenyl-1-butyne (52 g., 0.4 mole) which had been heated to 110° C. After approximately 5 g. of trichloromethylanesulfenyl chloride had been added, an exotherm occurred, raising the temperature to 155° C. The reaction mixture was cooled to 130° C. and the remaining trichloromethanesulfenyl chloride added at that temperature. The reaction mixture was then digested at 115–125° C. for 4 hours and distilled to provide 112 g. of liquid, B.P. 139–143° C./0.6 mm. Hg. Redistillation of the crude product provided 110 g. of yellow liquid, B.P. 129–132° C./0.6 mm. Hg, $n_D^{25}$ 1.5935. Infrared analysis and the following analytical data revealed that S-(1-chloro-1-phenylbutene-1-yl) trichloromethylsulfide had been obtained.

Analysis.—Calcd. for: C, 41.75%; H, 3.17%; Cl, 44.93%; S, 10.13%. Found: C, 42.21%; H, 3.17%; Cl, 44.30%; S, 10.00%.

In order to investigate the mechanism of the reaction, Example 7 was repeated under ultraviolet light at room temperature. A yellow liquid having the same boiling point as reported above was obtained, indicating that a free radical reaction had occurred.

EXAMPLE 8

Trichlorometanesulfenyl chloride (93 g., 0.5 mole) was added in 10 ml. increments to 3-hexyne (41 g., 0.5 mole) which had been heated to 80° C. During the addition an exothermic reaction occurred, raising the temperature to 115–120° C. Addition of the trichloromethanesulfenyl chloride was completed at 115° C., and the reaction mixture was digested at 100–110° C. for 2½ hours and then allowed to stand at room temperature overnight. Distillation of the reaction mixture provided 80 g. of liquid product boiling at 96–97° C./2.0 mm. Hg and 37 g. boiling at 97–100° C./2.0 mm. Hg. Redistillation of the combined distillates provided 99 g. of a light yellow liquid B.P. 94–95° C./1.9 mm. Hg $n_D^{25}$ 1.5363. Infrared analysis and the following analysis data revealed that S-(4-chlorohexene-3-yl)trichloromethylsulfide had been obtained.

Analysis.—Calcd. for: C, 31.20%; H, 3.74%; Cl, 53.00%; S, 11.94%. Found: C, 31.64%; H, 3.74%; Cl, 52.80%; S, 11.59%.

EXAMPLE 9

Following the procedure of Example 2, trichloromethanesulfenyl chloride (93 g., 0.5 mole) was added dropwise to methyl phenyl acetylene (58 g., 0.5 mole), which had been heated to 130° C. An exotherm occurred during the addition, raising the temperature to 150° C. The reaction maxture was then allowed to cool to 130° C. and the addition of trichloromethanesulfenyl chloride was completed at that temperature. The reaction mixture was digested at 130° C. for 4 hours and distilled to provide 85 g. of liquid boiling at 121–127° C./0.35 mm. Hg. Redistillation of the crude product provided 82 g. of of yellow liquid, B.P. 116–120° C./0.45 mm. Hg. $n_D^{25}$ 1.6042. Infrared analysis and the following analytical data revealed that S-(1-chloro-1-phenylpropene-1-yl) trichloromethylsulfide had been obtained.

Analysis.—Calcd. for: C, 39.73%; H, 2.64%; Cl, 47.02%; S, 10.60%. Found: C, 40.12%; H, 2.73%; Cl, 46.50%; S, 10.35%.

EXAMPLE 10

Trichloromethanesulfenyl chloride (37.2 g., 0.2 mole) was added dropwise with vigorous stirring to 1,4-dichloro-2-butyne (24.6 g., 0.2 mole) which had been heated to 130° C. Shortly after the addition was initiated, an exotherm occurred and the temperature rose to 155° C. The addition was regulated so as to maintain a reaction temperature of 155° C. After the addition was completed, the reaction mixture was digested at 155° C. for 3 hours and distilled to provide 29 g. of a yellow liquid, B.P. 126–134° C./⅛ mm. Hg. Redistillation of the crude product provided 26 g. of yellow liquid, B.P. 131–133° C./⅛ mm. Hg, $n_D^{25}$ 1.5387. Infrared analysis and the following analytical data revealed that S-(1,2,4-trichlorobutene-3-yl) trichloromethyl had been obtained.

Analysis.—Calcd. for: C, 19.40%; H, 1.29%; Cl, 68.90%; S, 10.36%. Found: C, 19.63%; H, 1.38%; Cl, 68.80%; S, 10.02%.

EXAMPLE 11

2-pentyne (32.2 g., 0.474 mole) was added to trichloromethanesulfenyl chloride (43.2 g., 0.232 mole) in a 100 ml. 2-necked round bottom flask equipped with thermometer, water condenser and magnetic stirrer. The reaction mixture was refluxed at 55–60° C. for 2 hours. The excess 2-pentyne was then removed by distillation and the temperature of the reaction mixture allowed to rise to 80–82° C. The reaction mixture was digested overnight at 80–82° C. and distilled to provide 75 g. (100% yield) of yellow liquid, B. P. 90–92° C./2.6 mm. Hg, $n_D^{25}$ 1.5387. Infrared analysis and the following analytical data revealed that S-(3-chloropentene-2-yl) trichloromethylsulfide had been obtained.

Analysis.—Calcd. for: C, 28.34%; H, 3.15%; Cl, 55.90%. Found: C, 28.56%; H, 3.31%; Cl, 56.10%.

EXAMPLE 12

Following the procedure of Example 2, trichloromethanesulfenyl chloride (18.6 g., 0.1 mole) was added to 1-octyne (11 g., 0.1 mole), which had been previously heated to 100–110° C. The rate of addition was adjusted to maintain a reaction temperature between about 120–130° C. After the addition was completed, the reaction solution was digested at 50–60° C. overnight and distilled to provide 18 g. (75% yield) of a yellow liquid, B.P. 124–132° C./2.7 mm. Hg. Redistillation provided 16 g. of pure product, B.P. 127–131° C./2.7 mm. Hg $n_D^{25}$ 1.5159. Infrared analysis and the following analytical data revealed that S-(2-chloro-octene-1-yl) trichloromethtylsulfide had been obtained.

Analysis.—Calcd. for: C, 36.50%; H, 4.73%; S, 10.81%. Found: C, 37.17%; H, 4.96%; S, 10.69%.

EXAMPLE 13

Trichloromethanesulfenyl chloride (93 g., 0.5 mole) was heated to 120° C. in a 250 ml. 3-necked round bottom flask equipped with thermometer, magnetic stirrer, water condenser and a dropping funnel. 1-heptyne (48 g., 0.5 mole) was added dropwise to the trichloromethanesulfenyl chloride at such a rate as to maintain a reaction temperature between about 120–130° C. After the addition was completed, the reaction mixture was digested at 120–130° C. for 4 hours and then at 60–70° C. overnight. Distillation of the reaction mixture provided 35 g. of crude product boiling at 65–82° C./0.3 mm. Hg. Redistillation provided a yellow liquid, B.P. 80–81° C./0.3 mm. Hg, $n_D^{25}$ 1.5214. Infrared analysis and the following analytical data revealed that S-(2-chloroheptene-1-yl) trichloromethylsulfide had been obtained.

Analysis.—Calcd. for: C, 34.05%; H, 4.26%; Cl, 50.00%. Found: C, 34.65%; H, 4.20%; Cl, 50.07%.

EXAMPLE 14

Following the procedure of Example 2, trichloromethanesulfenyl chloride (93 g., 0.5 mole) was added in 3 ml. increments to 1-hexyne (41 g., 0.5 mole) which had been previously heated to reflux (71° C.). Shortly after the addition was begun, an exothermic reaction occurred, raising the temperature of the reaction mixture to 77° C. The addition was completed at that temperature and the reaction mixture refluxed for about 48 hours at a temperature beginning at about 80° C. and ending at about 105° C. Distillation of the reaction mixture provided 37 g. of a liquid boiling at 92–104° C./1.9 mm. Hg and 10 g. of a liquid boiling at 103–120° C./1.9 mm. Hg. The distillates were combined and distilled to provide 42 g. of cherry colored liquid, B.P. 95–98° C./2.0 mm. Hg, $n_D^{25}$ 1.5263. Infrared analysis and the following analytical data revealed that S-(2-chlorohexene-1-yl) trichloromethylsulfide had been obtained.

*Analysis.*—Calcd. for: S, 11.94%. Found: S, 11.38%.

EXAMPLE 15

Chromic oxide (80 g., 0.79 mole) was suspended in a mixture of 400 ml. glacial acetic acid and 50 ml. acetic anhydride in a 3-necked round bottom flask equipped with magnetic stirrer, water condenser, thermometer and dropping funnel. S-(2-chloro-1-phenylhexene-2-yl) trichloromethylsulfide (90 g., 0.262 mole), prepared in accordance with the procedure described in Example 2, was added in small increments to the reaction flask, while maintaining a reaction temperature between 15–20° C. by means of a Dry Ice-acetone bath. After the addition was completed, the reaction mixture was digested for 3 days at room temperature, poured onto 4,000 g. of ice-water with stirring to provide a precipitate, and allowed to stand overnight. The water was decanted, the precipitate washed several times with cold water and then extracted with chloroform. The chloroform solution was washed with cold water, decolorized with charcoal and dried over sodium sulfate. After evaporation of the chloroform, petroleum ether was added to provide 51 g. (52% yield) of solid product, which was purified by recrystallization from petroleum ether to provide white crystals, M.P. 118–120° C. Infrared analysis and the following analytical data revealed that the $\alpha$-chloro-$\beta$-trichloromethanesulfonyl alkene having the name S-(2-chloro-1-phenylhexen-1-yl) trichloromethylsulfone had been obtained.

*Analysis.*—Calcd. for: C, 41.60%; H, 3.73%; Cl, 37.80%; S, 8.52%. Found: C, 41.54%; H, 3.77%; Cl, 37.70%; S, 8.50%.

EXAMPLE 16

Following the procedure of Example 15, chromic oxide (72 g., 0.72 mole) was suspended in a mixture of 250 ml. glacial acetic acid and 25 ml. acetic anhydride. To this suspension was added S-(2-chloro-1,2-dibutylethylene-1-yl) trichloromethylsulfide (79 g., 0.24 mole), prepared as described in Example 3, while maintaining a reaction temperature between 15–20° C. When the addition was completed, the reaction mixture was digested overnight at room temperature and then poured with vigorous stirring onto 4,000 g. of ice water. An oily precipitate separated from the reaction mixture which was stirred vigorously until the precipitate hardened. The reaction mixture was decanted and the precipitate washed several times with cold water and then extracted with ether. The ether solution was dried over sodium sulfate and the ether evaporated, leaving behind an oily liquid. The oily liquid was treated with supercooled petroleum ether to provide a precipitate which was dried to provide 34 g. of white solid, M.P. 51–52° C. Infrared analysis and the following analytical data revealed that S-(2-chloro-1,2 - dibutylethylene-1-yl) trichloromethylsulfone had been obtained.

*Analysis.*—Calcd. for: C, 32.95%; H, 4.27%; S, 9.75%. Found: C, 33.11%; H, 4.31%; S, 9.79%.

EXAMPLE 17

Following the procedure of Example 15, S-(1-chloro-1-phenylbutene-1-yl) trichloromethylsulfide (63.2 g., 0.2 mole), prepared as described in Example 7, was added to a suspension of chromic oxide (50 g., 0.5 mole) in 200 ml. of glacial acetic acid and 25 ml. of acetic anhydride at a temperature of 15–20° C. When the addition was completed, the reaction mixture was digested at room temperature for about 40 hours and then poured onto 4,000 g. of ice water to provide a precipitate. The water was decanted and the precipitate washed with cold water until the filtrate was neutral to litmus paper. The precipitate was then recrystallized from benzene, washed with petroleum ether and dried to provide a crystalline product, M.P. 142–144° C. Infrared analysis and the following analytical data revealed that S-(1-chloro-1-phenylbuten-2-yl) trichloromethylsulfone had been obtained.

*Analysis.*—Calcd. for: C, 38.00%; H, 2.88%; Cl, 40.80%; S, 9.20%. Found: C, 37.83%; H, 2.86%; Cl, 40.70%; S, 9.17%.

EXAMPLE 18

Following the procedure of Example 15, S-(4-chloro-3-hexen-3-yl) trichloromethylsulfide (40.2 g., 0.15 mole), prepared as described in Example 8, was added dropwise to a suspension of chromic oxide (37.5 g., 0.375 mole) in a mixture of 150 ml. of glacial acetic acid and 25 ml. of acetic anhydride over a temperature range of 15–25° C. After the addition was completed, the reaction mixture was allowed to digest at room temperature overnight. At the beginning of the digestion period, an exotherm occurred, raising the temperature to 55° C. for a short period. After digestion was completed, the reaction mixture was poured onto 300 g. of ice water with stirring and neutralized with concentrated sodium hydroxide solution. The neutralized solution was extracted 3 times with chloroform and the combined chloroform extract washed with cold water, dried over anhydrous sodium sulfate and decolorized with charcoal. The chloroform was evaporated under vacuum. After standing overnight, 27 g. of crystals separated from solution. The crystals were separated by filtration and washed with petroleum ether to provide 11 g. of colorless crystals, M.P. 77–79° C. Infrared analysis and the following analytical data revealed that S-(4-chloro-3-hexen-3-yl) trichloromethylsulfone had been obtained.

*Analysis.*—Calcd. for: C, 28.00%; H, 3.33%; Cl, 47.33%; S, 10.70%. Found: C, 28.09%; H, 3.36%; Cl, 47.60%; S, 10.78%.

EXAMPLE 19

Following the procedure of Example 17, S-(1-chloro-1-phenylpropene-1-yl) trichloromethylsulfide (60.4 g., 0.2 mole) prepared as described in Example 9 was added to a suspension of chromic oxide (50 g., 0.5 mole) in a mixture of 250 ml. glacial acetic acid and 25 ml. acetic anhydride. The reaction mixture was treated in accordance with the procedure described in Example 17 to provide 35 g. of yellow crystals (52% yield), M.P. 132–135° C. Infrared analysis and the following analytical data revealed that S-(1-chloro-1-phenylpropene-2-yl) trichloromethylsulfone had been obtained.

*Analysis.*—Calcd. for: C, 36.00%; H, 2.39%; Cl, 42.60%; S, 9.60%. Found: C, 36.80%; H, 2.38%; Cl, 42.90%; S, 9.62%.

EXAMPLE 20

Following the procedure of Example 15, S-(3-chloropentene-2-yl) trichloromethylsulfide (23 g., 0.906 mole), prepared as described in Example 11, was added dropwise to a suspension of chromic oxide (22 g., 0.2 mole) in a mixture of 150 ml. glacial acetic acid and 25 ml. acetic anhydride. The reaction mixture was treated following the procedure of Example 18 to provide 8 g. of light yellow liquid, B.P. 120–123° C./2.7 mm. Hg, which crystallized on standing. Infrared analysis and the following analytical data revealed that S-(3-chloropentene-2-yl) trichloromethylsulfone had been obtained.

*Analysis.*—Calcd. for: C, 25.64%; H, 2.80%; Cl, 49.80%; S, 11.20%. Found: C, 25.74%; H, 2.90%; Cl, 48.80%; S, 11.68%.

What is claimed is:

1. $\alpha$-Chloro-$\beta$-trichloromethanesulfenyl alkenes having the formula:

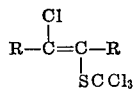

wherein each R is independently selected from the group consisting of hydrogen, alkyl, chloroalkyl, cycloaliphatic having from 5 to 7 carbon atoms and aryl having from 6 to 10 carbon atoms.

2. The compound of claim 1 wherein each R is independently selected from the group consisting of hydrogen, alkyl having from 1 to 5 carbon atoms, chloroalkyl having from 1 to 5 carbon atoms and aryl having from 6 to 10 carbon atoms.

3. The compound of claim 2 wherein R is hydrogen or alkyl having from 1 to 5 carbon atoms.

4. The α-chloro-β-trichloromethanesulfenyl alkene of claim 3 having the name S-(2-chloro-1,2-dibutylethylene-1-yl) trichloromethylsulfide.

5. The α-chloro-β-trichloromethanesulfenyl alkene of claim 3 having the name S-(2-chloro-1,2-dipropylethylene-1-yl) trichloromethylsulfide.

6. The α-chloro-β-trichloromethanesulfenyl alkene of claim 3 having the name S-(4-chlorohexene-3-yl) trichloromethylsulfide.

7. The α-chloro-β-trichloromethanesulfenyl alkene of claim 3 having the name S-(3-chloropentene-2-yl) trichloromethylsulfide.

8. The α-chloro-β-trichloromethanesulfenyl alkene of claim 3 having the name S-(2-chloro-octene-1-yl) trichloromethylsulfide.

9. The α-chloro-β-trichloromethanesulfenyl alkene of claim 3 having the name S-(2-chloroheptene-1-yl) trichloromethylsulfide.

10. The α-chloro-β-trichloromethanesulfenyl alkene of claim 3 having the name S-(2-chloro-1-hexene-1-yl) trichloromethylsulfide.

11. The compound of claim 2 wherein R is alkyl having from 1 to 5 carbon atoms or aryl having from 6 to 10 carbon atoms.

12. The α-chloro-β-trichloromethanesulfenyl alkene of claim 11 having the name S-(2-chloro-1,2-diphenylethylene-1-yl) trichloromethylsulfide.

13. The α-chloro-β-trichloromethanesulfenyl alkene of claim 11 having the name S-(2-chloro-1-phenylhexene-2-yl) trichloromethylsulfide.

14. The α-chloro-β-trichloromethanesulfenyl alkene of claim 11 having the name S-(1-chloro-1-phenylbutene-1-yl) trichloromethylsulfide.

15. The α-chloro-β-trichloromethanesulfenyl alkene of claim 11 having the name S-(1-chloro-1-phenylpropene-1-yl) trichloromethylsulfide.

16. The compound of claim 2 wherein R is alkyl having from 1 to 5 carbon atoms or chloroalkyl having from 1 to 5 carbon atoms.

17. The α-chloro-β-trichloromethanesulfenyl alkene of claim 16 having the name S-(1,5-dichlorononene-4-yl) trichloromethylsulfide.

18. The α-chloro-β-trichloromethanesulfenyl alkene of claim 16 having the name S-(1,5-dichlorodecene-4) trichloromethylsulfide.

19. The α-chloro-β-trichloromethanesulfenyl alkene of claim 16 having the name S-(1,2,4-trichlorobutene-3-yl) trichloromethylsulfide.

References Cited
FOREIGN PATENTS 162,185  5/1963  Russia.

CHARLES B. PARKER, Primary Examiner

D. R. PHILLIPS, Assistant Examiner

U.S. Cl. X.R.

71—98, 103; 260—607; 424—337